United States Patent
Matsugashita

(10) Patent No.: US 7,595,905 B2
(45) Date of Patent: Sep. 29, 2009

(54) METHOD AND DEVICE FOR ISSUING TICKETS TO CLIENTS BASED ON REGISTRATION AND RESTORATION ONCE A SHUTDOWN OCCURS

(75) Inventor: Hayato Matsugashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 812 days.

(21) Appl. No.: 11/258,298

(22) Filed: Oct. 25, 2005

(65) Prior Publication Data
US 2006/0087691 A1    Apr. 27, 2006

(30) Foreign Application Priority Data
Oct. 27, 2004  (JP) ............................. 2004-312922
Sep. 15, 2005  (JP) ............................. 2005-268765

(51) Int. Cl.
*G06F 3/12* (2006.01)
(52) U.S. Cl. .................... 358/1.15; 358/1.16; 709/203
(58) Field of Classification Search ................ 709/201, 709/217, 219, 203; 358/1.11–1.16
See application file for complete search history.

(56) References Cited

U.S. PATENT DOCUMENTS

| 6,115,132 A | 9/2000 | Nakatsuma |
| 6,256,750 B1 * | 7/2001 | Takeda ......................... 714/11 |
| 2002/0097431 A1 * | 7/2002 | Ikegami ..................... 358/1.15 |
| 2002/0099831 A1 | 7/2002 | Tsunogai |

FOREIGN PATENT DOCUMENTS

| JP | 10-240469 | 9/1998 |
| JP | 2002-222123 | 8/2002 |

* cited by examiner

*Primary Examiner*—Kimberly A Williams
(74) *Attorney, Agent, or Firm*—Canon U.S.A., Inc., IP Division

(57) ABSTRACT

An information management device and method for processing requests in the order the requests are sent without applying a load exceeding a permissible limit. The device and method includes receiving requests from a plurality of client devices, storing a management table managing the requests sent from the client devices based on the order of the requests sent, determining whether each request is registerable on the management table when the request is received by the receiving unit, registering the request on the management table when the request is determined by the determining unit to be registerable on the management table, and issuing a numbered ticket regardless of whether the request is determined to be registerable on the management table, and sending the numbered ticket to the corresponding client device from which the request was sent.

19 Claims, 14 Drawing Sheets

FIG. 5

| REQUEST ID | PROCESSING STATE | CLIENT INFO |
|---|---|---|
| ○○○○○ | IN PROGRESS | CLIENT A |
| △△△△△ | PENDING | CLIENT B |
| ... | ... | ... |
| ... | ... | ... |
| ... | ... | ... |
| ... | ... | ... |
| ... | ... | ... |

205a

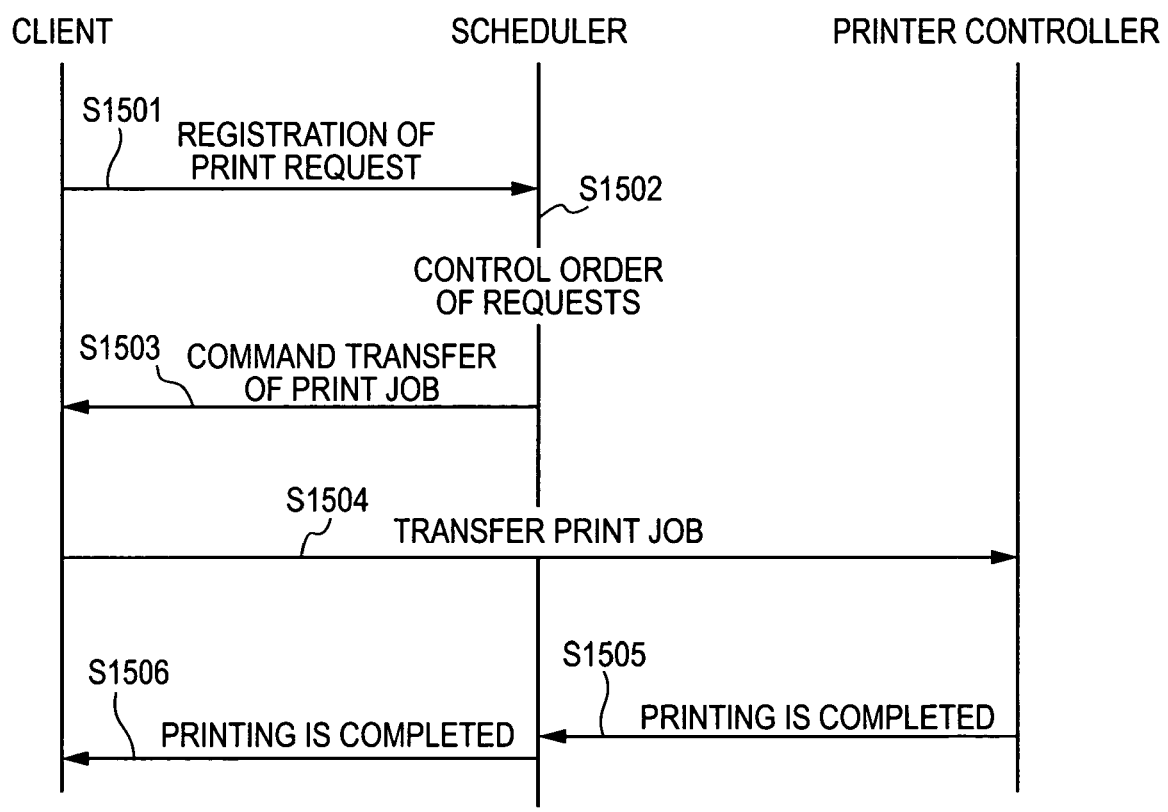

METHOD AND DEVICE FOR ISSUING TICKETS TO CLIENTS BASED ON REGISTRATION AND RESTORATION ONCE A SHUTDOWN OCCURS

BACKGROUND OF THE INVENTION

1. Field of the Invention

The present invention relates to information management devices, information management systems including such information management devices and client devices, information management methods, and programs that allow computers to perform such information management methods.

2. Description of the Related Art

In recent years, networks such as the Internet and local area networks (LAN) have become widely used, and client devices can request for resources and services to application servers or devices through these types of networks. The application servers or devices receive requests from the client devices and perform various kinds of processes.

Since these application servers or devices have a limited processing ability in the CPU and a limited memory capacity, the processable amount in a single operation is physically limited. For example, in a network printing system, if a large number of print jobs are sent from a plurality of client devices to an application server or a printer so as to exceed the processing capacity of the application server or the printer, the processing may take more time than expected or may result in an error. Moreover, in some cases, this could lead to a shutdown of the application server or the printer.

In recent years, a system has been discussed in which the application server or the printer accepts print requests that do not include, for example, the rendering data of print jobs before accepting the actual print jobs, i.e. print requests, from the client devices so as to limit the storing amount of data. Such a system is discussed in, for example, Japanese Patent Laid-Open No. 10-240469. In this system, when a print request reaches its turn in the printing order of the printer, the corresponding client device sends the print job to the printer. According to this system, the application server or device can constantly perform a proper operation within its processing ability range.

However, according to the system discussed in Japanese Patent Laid-Open No. 10-240469, the system requires a server since the print-job information of the print requests is managed by a server. This is problematic for small offices since such a system leads to high costs. For this reason, there have been demands in recent years for a printer equipped with an order arrangement function for print jobs. However, providing a high-capacity memory unit (HDD) in a printer leads to an increase in the overall cost of the printer.

In order to solve this problem, a system in which a network interface (information management device) installed in the printer is provided with a RAM of about 256 megabytes is discussed. Using this memory, the printer accepts print requests that do not include the rendering data of print jobs, whereby the management of the printing order can be performed at a lower cost. However, even if only the print requests not including the rendering data of print jobs are to be managed, the amount of information to be managed, such as printing attributes, is increasing in recent years. For this reason, in the management space in the memory of the network interface, the print requests must be limited to about 256 megabytes, meaning that print requests exceeding this limit are subject to be refused.

In this system, a first client device whose print request is refused will normally try to send the print request again. However, depending on the timing at which the information management device defined by the network interface has availability for accepting print requests, there may be a case where a print request sent from a second client device after the first client device is accepted prior to the print request from the first client device. In other words, the print requests are not properly processed in the order of the print requests sent.

Furthermore, a conventional technology is also known in which the order of requests from client devices is managed by a scheduler, and the number of request is managed so as not to exceed the processing capacity of an application server or device. For example, according to Japanese Patent Laid-Open No. 2002-222123, a scheduler (i.e. a reception server) that manages the connection and the connection number of an application server is provided. Specifically, when a client device requests for a connection to the application server, the client device first sends a connection request to the scheduler. In response to a first connection request received from the client device, the scheduler issues a numbered ticket provided with a reference number. Then, the scheduler registers the connecting order of priority to the application server on a schedule table based on the reference number on the numbered ticket. Subsequently, in response to a second connection request from the client device, the scheduler allows the client device to be connected to the application server if the scheduler determines that the application server is connectable based on the connecting order of priority. Accordingly, the connection number to the application server and the order of connection requests from the client devices can be controlled.

However, in recent years, server-less systems and systems having a server function embedded in a device are becoming more common for the purpose of cutting down on the TCO (Total Cost of Ownership). For this reason, it is becoming more difficult to obtain the sufficient processing ability and reliability that are required in a server.

According to a scheduler discussed in Japanese Patent Laid-Open No. 10-240469 mentioned above, the scheduler requires a schedule table for managing the requests received from the client devices. However, an embedded server (information management device), such as the network interface, installed in the printer has a significantly limited memory capacity due to the cut-down on manufacturing costs, and for this reason, it is presumably difficult to prepare a schedule table having a dimension sufficient for the number of requests from the client devices. For example, if a large number of requests are sent from a plurality of client devices to an extent that the requests exceed the permissible limit of the schedule table, the scheduler cannot properly process the requests, and moreover, cannot follow the exact order of the requests sent. Furthermore, if the requests exceed the permissible limit of the schedule table, the scheduler could be forced to shut down.

Furthermore, according to such an embedded server incorporated in a device, the embedded server is normally turned off automatically when the power of the device is cut off. This means that the embedded server is in an environment in which it can be turned off more easily than a server that is disposed independent of a conventional printer. Since an embedded server usually does not have a secondary memory unit (a nonvolatile storage medium), when the embedded server is turned off, the schedule table is reset after every activation process. This is problematic in that during a restoring process from the power-off state, the order of requests received prior to the power-off state is lost.

SUMMARY OF THE INVENTION

The present invention provides an information management device, an information management system, an information management method, and a program in which requests from client devices are processed in the order of the requests sent without applying a load exceeding the permissible limit.

Accordingly, the present invention is conceived as a response to the above-described disadvantages of the conventional art.

According to an aspect of the present invention, an information management device is provided, which includes a receiving unit configured to receive requests from a plurality of client devices; a management-table memory unit configured to store a management table managing the requests sent from the plurality of client devices based on the order of the requests sent; a determining unit configured to determine whether each request is registerable on the management table when the request is received by the receiving unit; a registering unit configured to register the request on the management table when the request is determined by the determining unit to be registerable on the management table; and a numbered-ticket management unit configured to issue a numbered ticket when the request is determined by the determining unit to be non-registerable on the management table, and sending the numbered ticket to the corresponding client device from which the request was sent.

According to the present invention, the requests from the client devices can be processed in the order of the requests sent without applying a load exceeding the permissible limit.

Further features of the present invention will become apparent from the following description of exemplary embodiments with reference to the attached drawings, in which like reference characters designate the same or similar parts throughout the figures there.

BRIEF DESCRIPTION OF THE DRAWINGS

FIG. 5 is a schematic diagram illustrating the management content in a schedule table.

FIG. 15 is a sequence diagram of a process performed between a client device and a printer in the printing information management system.

DESCRIPTION OF THE EMBODIMENTS

Exemplary embodiments of the present invention will now be described with reference to the drawings. It should be noted that the relative arrangement of the components, the numerical expressions, and numerical values set forth in these embodiments do not limit the scope of the present invention unless it is specifically stated otherwise.

First Embodiment

Figure 1:
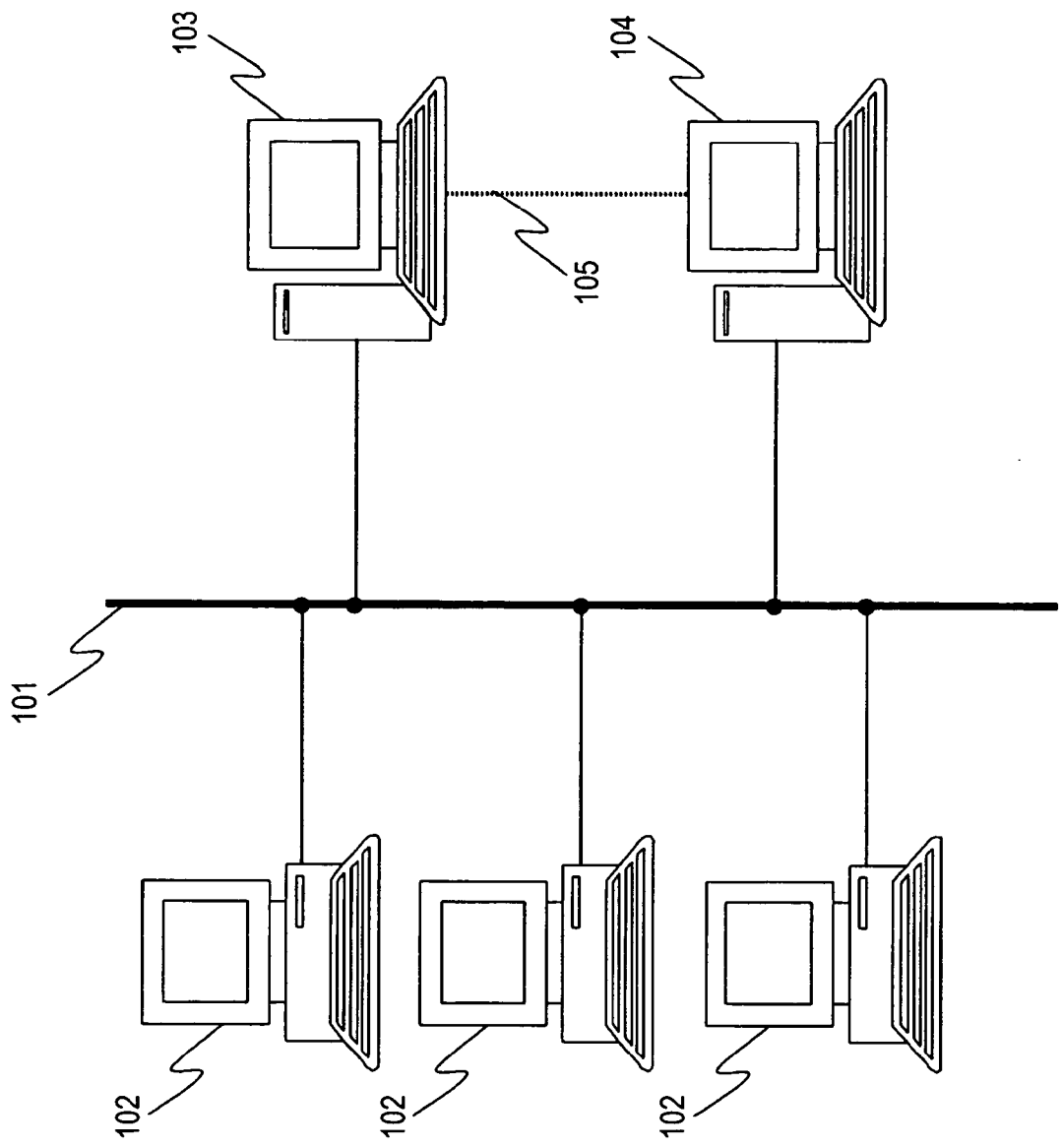
FIG. 1 is a schematic diagram of an information management system according to a first embodiment of the present invention.

FIG. 1 is a schematic diagram of an information management system according to a first exemplary embodiment of the present invention.

Referring to FIG. 1, the information management system according to the first exemplary embodiment includes a network 101, such as the Internet or a LAN, a plurality of client devices 102 operated by users, an application server or device (hereinafter referred to as an application server 103) which receives requests from the client devices 102 and performs a predetermined process, and a scheduler 104 defining an information management device which receives requests from the client devices 102 and manages, for example, the requests. Furthermore, these devices are connected to one another via the network 101 so as to exchange data with one another.

Each client device 102 is a commonly-used information-processing device and is provided with a connecting unit for connecting the client device 102 to the application server 103 and the scheduler 104 via the network 101, and an input-output unit for sending and receiving data. On the other hand, the application server 103 and the scheduler 104 are connected to each other via a local network 105.

Although the scheduler 104 may be a commonly-used information-processing device, the scheduler 104 operates as a so-called embedded server that is embedded in a printer in the first embodiment, and stores a schedule management program according to the first embodiment.

Figure 2:
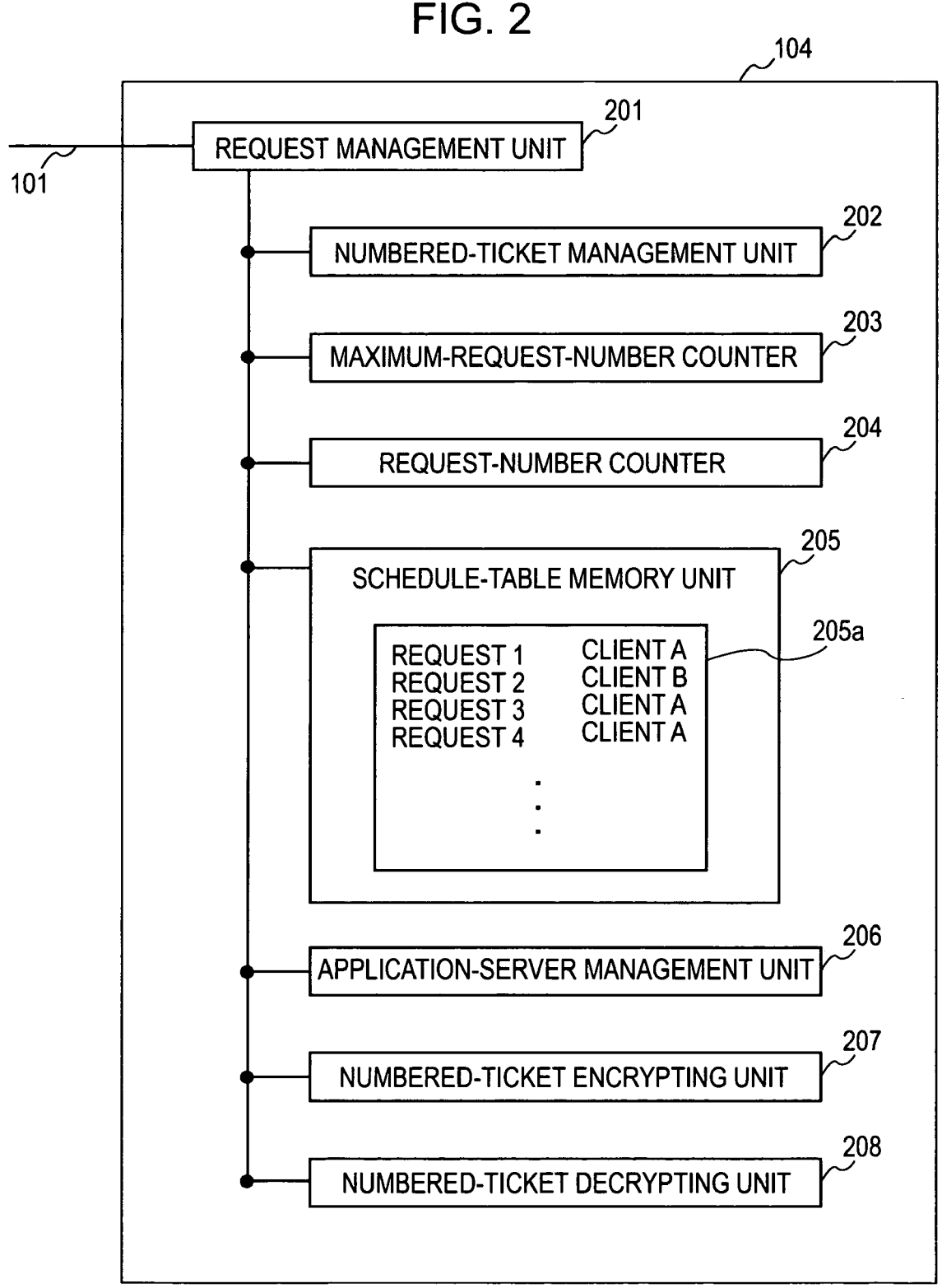
FIG. 2 schematically illustrates an internal structure of a scheduler.

FIG. 2 schematically illustrates the internal structure of the scheduler 104.

Referring to FIG. 2, the scheduler 104 includes a request management unit 201 which receives a connection request from each client device 102 via the network 101 and performs management of the connection or send and receive data, a numbered-ticket management unit 202 configured to manage issued numbered tickets, a schedule-table memory unit 205 configured to store a schedule table 205a defining a management table which manages the requests from the client devices 102 as a queue, a maximum-request-number counter 203 configured to maintain the maximum number of requests that can be registered on the schedule table 205a, a request-number counter 204 configured to count the number of requests currently managed by the schedule table 205a, an application-server management unit 206 configured to manage the condition of the application server 103, a numbered-ticket encrypting unit 207 configured to encrypt each issued numbered ticket, and a numbered-ticket decrypting unit 208 configured to decrypt each encrypted numbered ticket. In one embodiment, the scheduler 104 operates in two modes, a regular mode and an order arrangement mode. The shifting condition between the two modes will be described in detail below.

Figure 3:
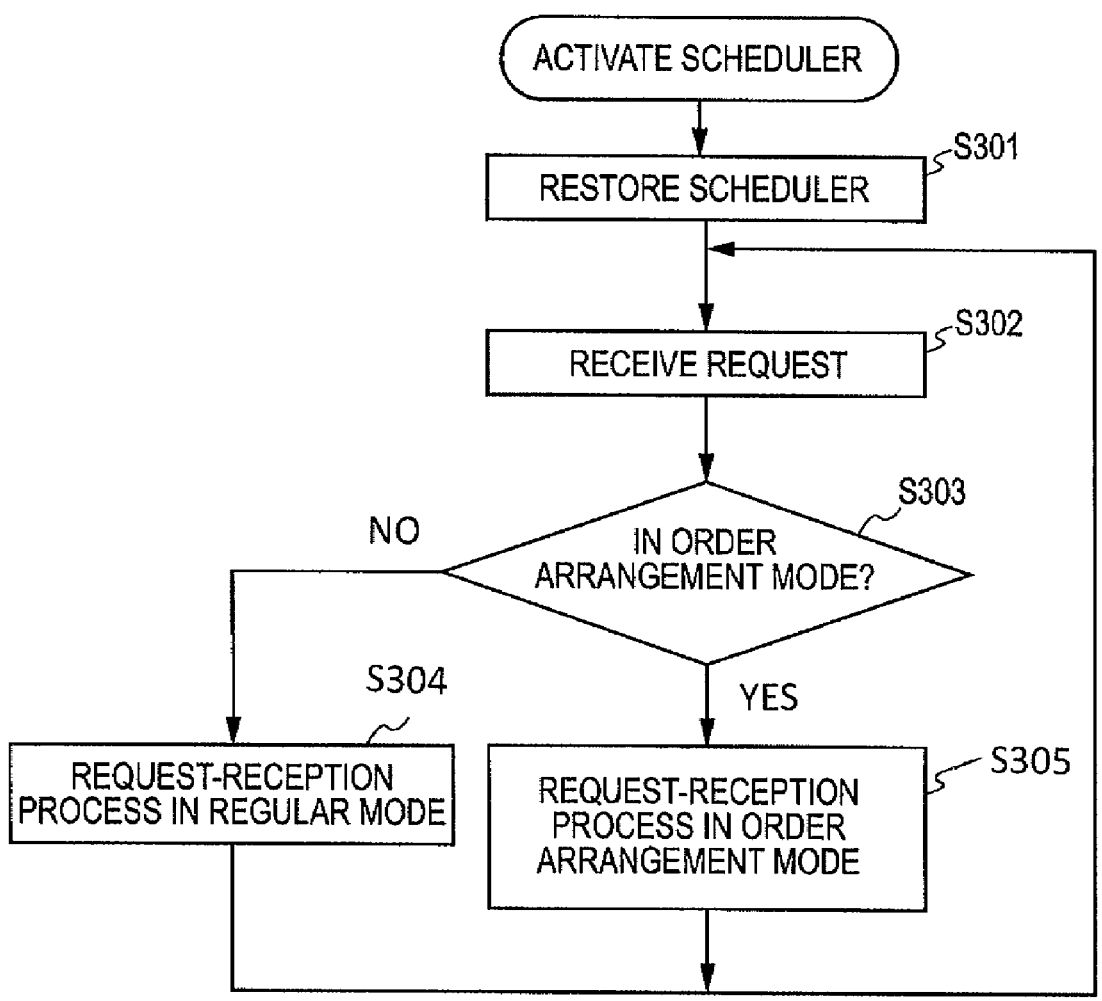
FIG. 3 is a flow chart of an operation performed by the scheduler in a case where a request is received from one of client devices.

FIG. 3 is a flow chart of an operation performed by the scheduler 104 in a case where a request is received from one of the client devices 102.

Specifically, when the scheduler 104 is activated, a restoring process of the scheduler 104 is performed in step S301. This restoring process will be described in detail below. Based on the result of the restoring process performed in step S301, the scheduler 104 shifts to the regular mode or the order arrangement mode. When this restoring process is completed, the scheduler 104 switches to a request-reception waiting state.

Subsequently, when the scheduler 104 receives a request from one of the client devices 102 in step S302, the operation proceeds to step S303, where the scheduler 104 determines whether it is currently in the regular mode or the order arrangement mode. Based on the determination result, if it is determined that the scheduler 104 is in the regular mode, the operation proceeds to step S304 where the scheduler 104 performs a request-reception process corresponding to the regular mode, which will be described in detail below. On the other hand, if it is determined in step S303 that the scheduler 104 is in the order arrangement mode, the operation proceeds to step S305 where the scheduler 104 performs a request-reception process corresponding to the order arrangement mode. When either the reception processes is completed, the scheduler 104 returns to the request-reception waiting state in step S302.

Figure 4:
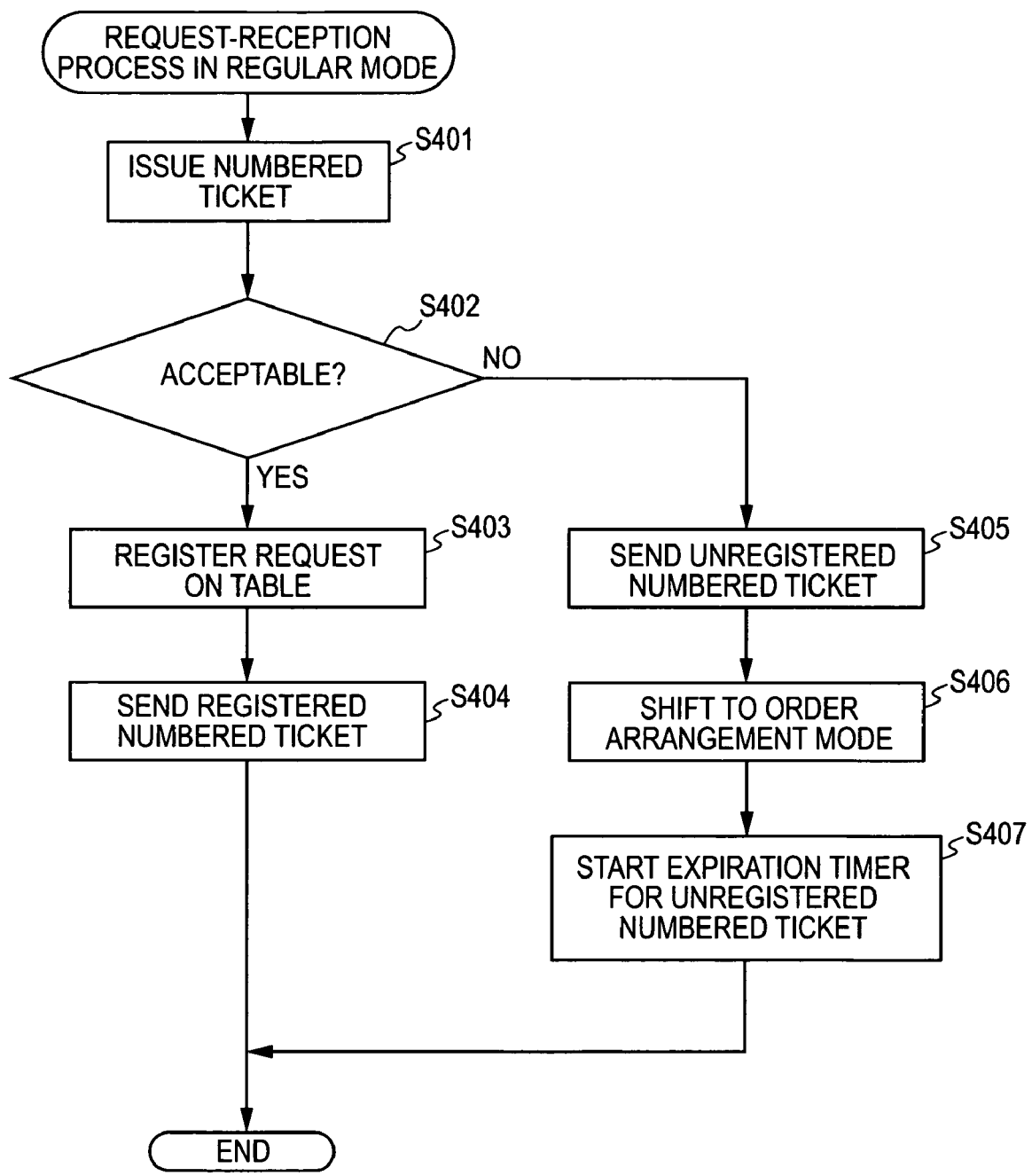
FIG. 4 is a flow chart of a request-reception process corresponding to a regular mode performed in the scheduler shown in step S304 in FIG. 3.

FIG. 4 is a flow chart of the request-reception process corresponding to the regular mode shown in step S304 in FIG. 3.

When the scheduler 104 receives a request from one of the client devices 102 during the regular mode, a numbered ticket is issued in step S401 by the numbered-ticket management unit 202. Subsequently, in step S402, it is determined whether the request is acceptable. In this case, the determination in step S402 is made by comparing the maximum-request-number counter 203 to the request-number counter 204, and then determining whether the schedule table 205a currently has availability for registering the request thereon.

If it is determined that the request is acceptable in step S402, the operation proceeds to step S403. Then, in step S403, the received request is registered on the schedule table 205a. In step S404, an identifier indicating that the request is registered on the schedule table 205a is given to the numbered ticket issued in step S401 so as to produce a registered numbered ticket, and subsequently, the registered numbered ticket is sent to the client device 102 that made the request.

On the other hand, if it is determined in step S402 that the request is not acceptable, the operation proceeds to step S405. Then, in step S405, an identifier indicating that the request is not registered on the schedule table 205a is given to the numbered ticket issued in step S401 so as to produce an unregistered numbered ticket, and subsequently, the unregistered numbered ticket is sent to the client device 102 that made the request. In step S406, the scheduler 104 switches to the order arrangement mode from the regular mode. Then, in step S407, the scheduler 104 commands the numbered-ticket management unit 202 to start an expiration timer for the unregistered numbered ticket.

FIG. 5 is a schematic diagram illustrating the management content in the schedule table 205a.

In the schedule table 205a, a request ID 2051 of each request, a processing state 2052 of each request, and client information 2053 corresponding to each request are registered. Under the column of the client information 2053, a client name for identifying the corresponding client device 102 or an IP address used as communication means with the corresponding client device 102 is registered.

In one embodiment of the present invention, for example, if a request is already being processed in the application server 103, a section under the column of the processing state 2052 corresponding to the request indicates "IN PROGRESS", whereas if the request is waiting to be processed in the application server 103, the section indicates "PENDING". Alternatively, although the two states "IN PROGRESS" and "PENDING" under the column of the processing state 2052 are managed in a single management table according to the schedule table 205a shown in FIG. 5, in another embodiment, the two states may be managed individually in separate management tables. Furthermore, in the processing state 2052, the number of requests that can be shifted to the "IN PROGRESS" state may be one or more, and is set in correspondence with the processing ability of the application server 103.

Figure 6:
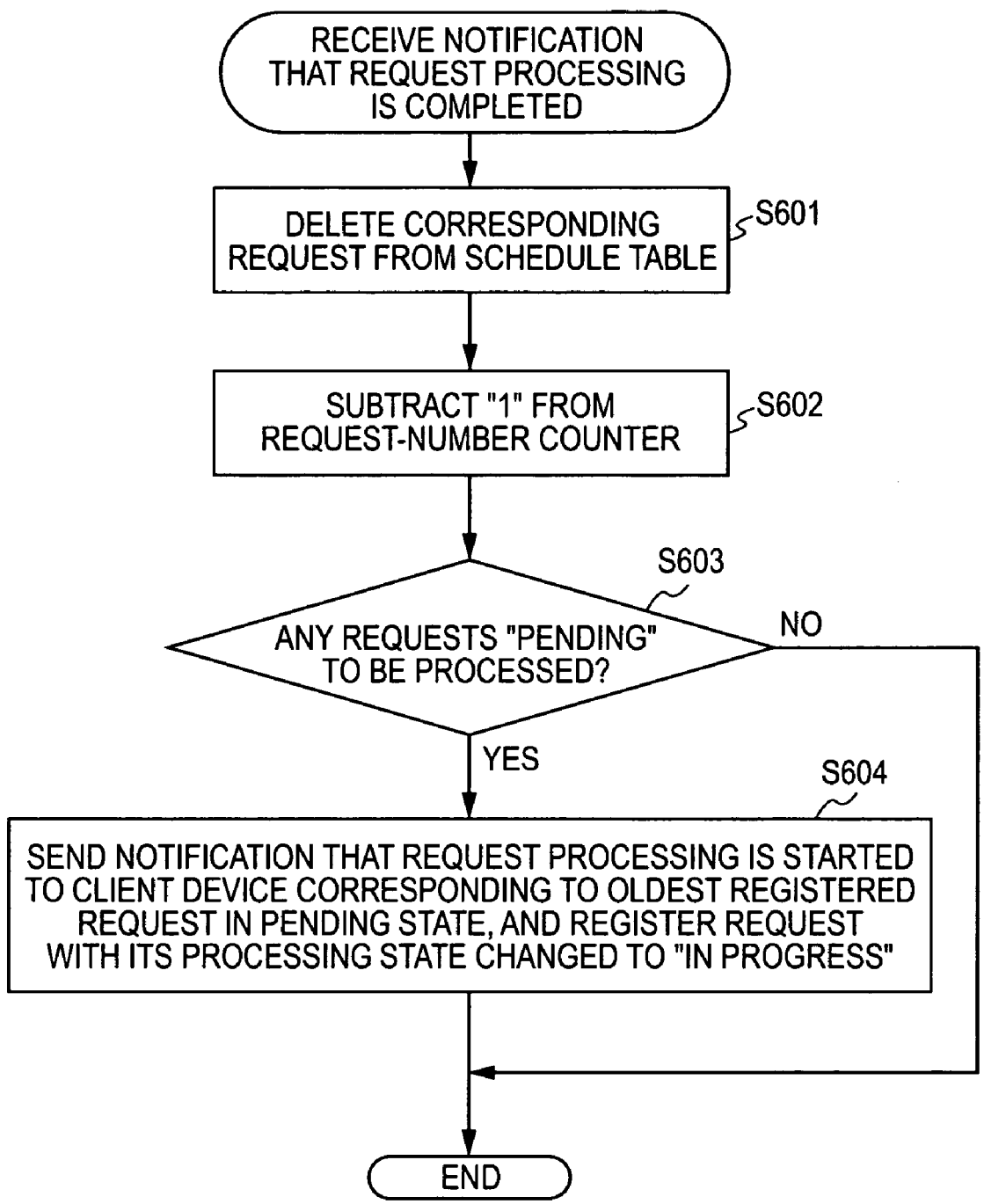
FIG. 6 is a flow chart of an operation performed in the scheduler when a notification that request processing is completed is received by the corresponding client device.

FIG. 6 is a flow chart of an operation performed in the scheduler 104 when a notification that request processing is completed is received by the corresponding client device 102.

First, when the application-server management unit 206 receives a notification from the application server 103 that the request processing is completed, the application-server management unit 206 sends information used for identifying the processed request, which may be a reference number, to the request management unit 201. The request management unit 201 receiving the information then identifies the corresponding request in the schedule table 205a, and notifies the client device 102 from which the request was sent that the request processing is completed. Subsequently, in step S601, the request management unit 201 deletes the request from the schedule table 205a. Alternatively, in a case where a notification of completion of the request processing is received from a client device 102 currently processing its own request in the application server 103, the request management unit 201 similarly deletes the corresponding request from the schedule table 205a.

Next, in step S602, a value "1" is subtracted from the current total value of the request-number counter 204. Then, in step S603, of the requests currently registered on the schedule table 205a, it is determined whether there are requests that are "PENDING" to be processed. If it is determined that there are requests in the "PENDING" state, the operation proceeds to step S604. In step S604, a notification that the request processing is started is sent to the client device 102 corresponding to the oldest registered request of the requests registered on the schedule table 205a that are in the "PENDING" state. Moreover, the oldest request is re-registered on the schedule table 205a with its processing state changed to "IN PROGRESS". When step S604 is completed, or based on the determination result in step S603, if it is determined that there are no requests in the "PENDING" state, the operation performed in the scheduler 104 after the reception of the notification of completion of request processing is completed.

According to the operation shown in FIG. 6, the scheduler 104 processes the plurality of requests received from the client devices 102 in a proper order, and moreover, adjusts the processing load of the application server 103.

Figure 7:
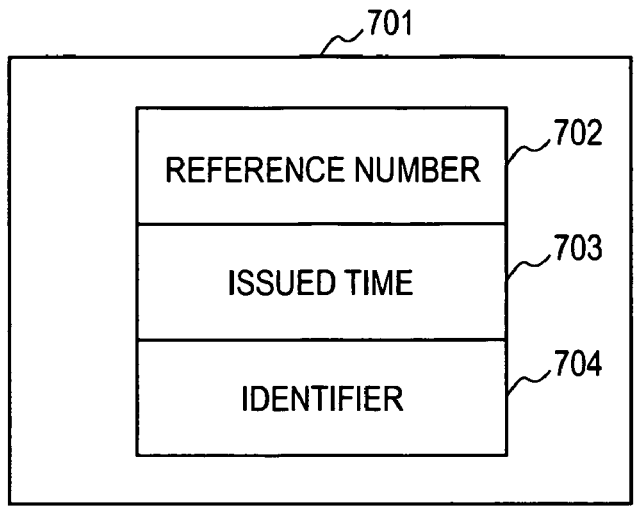
FIG. 7 schematically illustrates a numbered ticket issued by a numbered-ticket management unit.

FIG. 7 illustrates an example of a numbered ticket 701 issued by the numbered-ticket management unit 202.

The numbered ticket 701 includes a reference number 702 indicating a number in the order of requests; issued time 703 indicating the time and date the numbered ticket 701 was issued; and an identifier 704 indicating whether or not the numbered ticket 701 is registered on the schedule table 205a. The reference number 702 may be in any form as long as it indicates the number in the order of requests. According to one embodiment, the reference number 702 is a series of integers. In view of reducing the excessive load on the scheduling process and properly performing the scheduling process of the requests, the issued time 703 and the identifier 704 are not necessarily required. However, the issued time 703 and the identifier 704 are effective and useful when performing an expiration determining process as shown in the flow chart in FIG. 12 and a restoring process as shown in the flow chart in FIG. 13. The expiration determining process and the restoring process will be described in detail below. Furthermore, the data format of the numbered ticket 701 may be in a markup language format or in a unique binary data format.

In order to prevent fabrication of forged tickets, the numbered ticket 701 can be encrypted by the numbered-ticket encrypting unit 207. Encryption techniques for encrypting the numbered ticket 701 include a unique encryption technique that allows decryption only by the scheduler 104, and an encryption technique that allows decryption also by the corresponding client device 102. In the former technique, only the identifier 704 needs to be decrypted by the corresponding client device 102. In a case where the numbered ticket 701 is encrypted, the encrypted numbered ticket 701 can be decrypted by the numbered-ticket decrypting unit 208.

The scheduler 104 may also be provided with a validity determination unit (not shown) configured to determine whether or not the numbered ticket 701 sent from the corresponding client device 102 is valid based on the issued time 703 included in the numbered ticket 701. The validity determination unit compares the issued time 703 of the numbered ticket 701 sent from the corresponding client device 102 with the issued time of the oldest currently-issued numbered ticket. If the issued time 703 of the numbered ticket 701 sent from the corresponding client device 102 is previous to the issued time of the oldest numbered ticket, the validity determination unit determines that the numbered ticket 701 sent from the corresponding client device 102 is invalid. Accordingly, this prevents the scheduler 104 from accidentally accepting requests corresponding to numbered tickets issued in the past.

Figure 8:
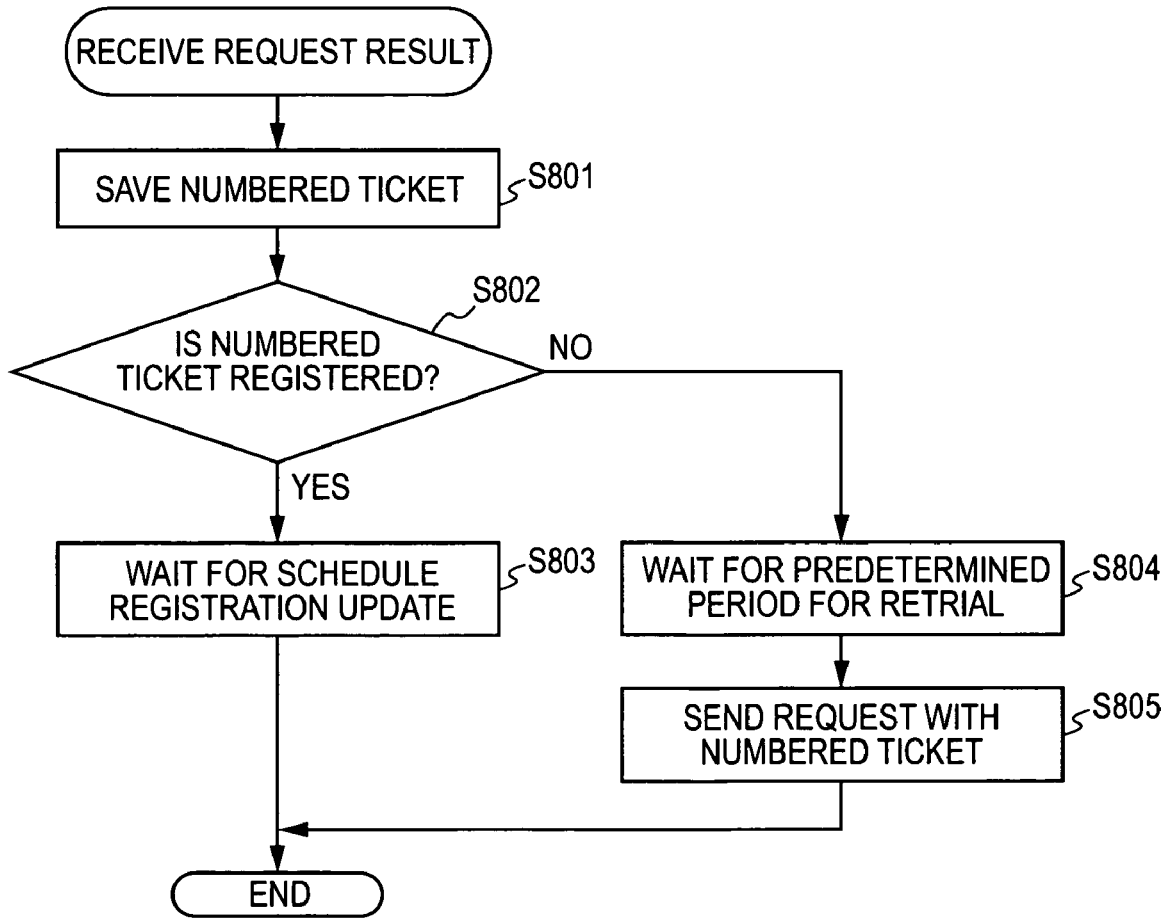
FIG. 8 is a flow chart of an operation performed in one of the client devices when the client device receives a numbered ticket from the scheduler in response to its own request.

FIG. 8 is a flow chart of an operation performed in one of the client devices 102 when the client device 102 receives a numbered ticket 701 from the scheduler 104 in response to its own request.

When the client device 102 receives the result of the request, the client device 102 saves the numbered ticket 701 sent from the scheduler 104 in step S801. Subsequently, in step S802, the client device 102 determines whether the numbered ticket 701 is registered on the schedule table 205a. This determination is based on the detection of the identifier 704 in the numbered ticket 701.

If it is determined in step S802 that the numbered ticket 701 sent from the scheduler 104 is registered on the schedule table 205a, the operation proceeds to step S803. In step S803, the client device 102 gives permission to the scheduler 104 to allow the request to be processed in the application server 103 and waits until the client device 102 is notified that the registration data in the schedule table 205a is updated.

On the other hand, if it is determined that the numbered ticket 701 sent from the scheduler 104 is not registered on the schedule table 205a in step S802, the operation proceeds to step S804. In step S804, the client device 102 waits for a predetermined period for retrial. After waiting for the predetermined period for retrial in step S804, the client device 102 sends a request to the scheduler 104 again in step S805. In this case, the received unregistered numbered ticket 701 is attached to the request.

Figure 9:
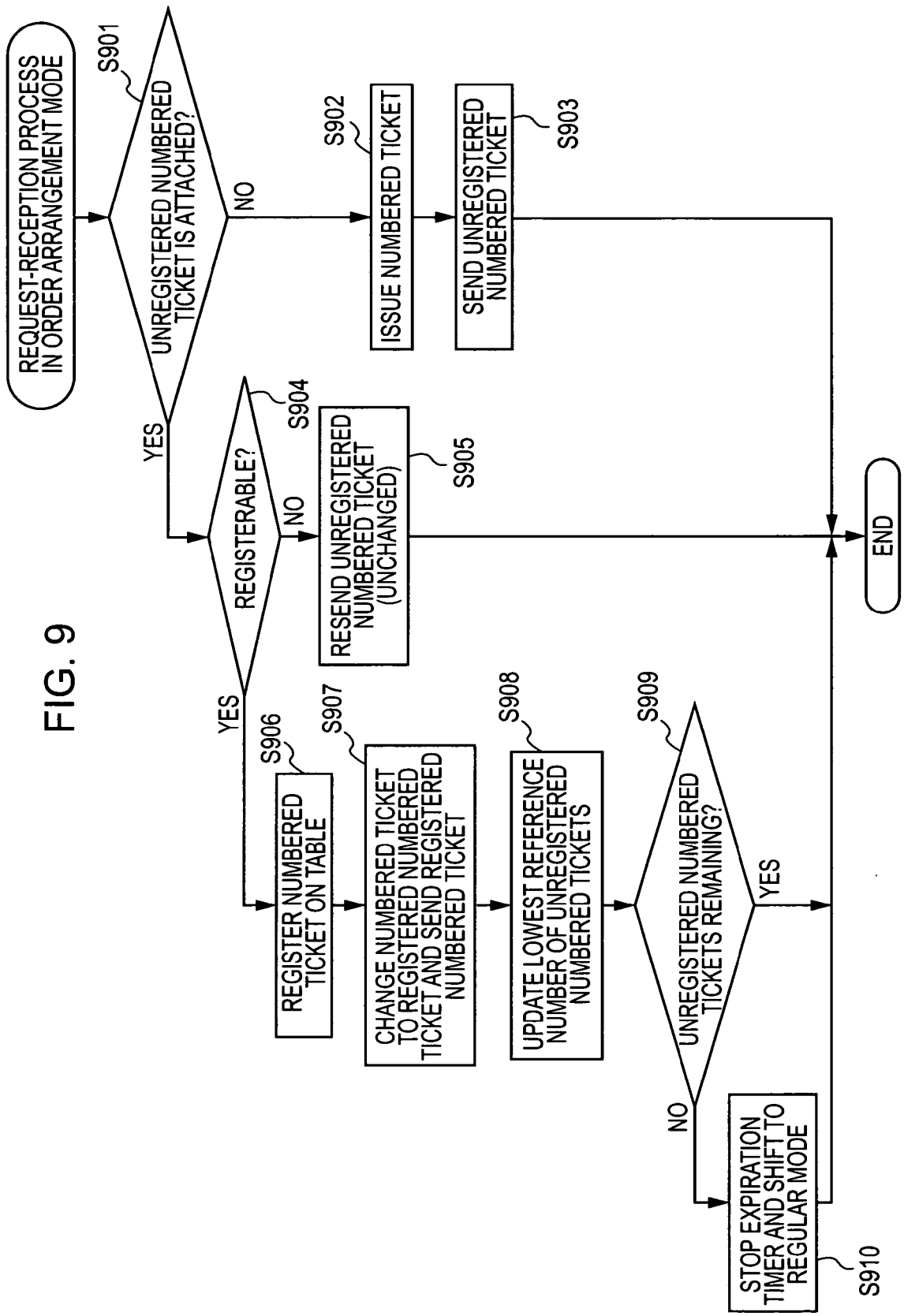
FIG. 9 is a flow chart of a request-reception process corresponding to an order arrangement mode performed in the scheduler in step S305 shown in FIG. 3.

FIG. 9 is a flow chart of the request-reception process corresponding to the order arrangement mode performed in the scheduler 104 in step S305 shown in FIG. 3.

When the scheduler 104 in the order arrangement mode receives a request from one of the client devices 102, the scheduler 104 determines whether an unregistered numbered ticket is attached to the request in step S901. If it is determined that an unregistered numbered ticket is not attached to the request, the operation proceeds to step S902 where the numbered-ticket management unit 202 issues a new numbered ticket. The operation then proceeds to step S903. In step S903, the numbered ticket issued in step S902 is given an identifier indicating that the numbered ticket is unregistered. The unregistered numbered ticket is then sent to the client device 102 that made the request.

On the other hand, if it is determined that an unregistered numbered ticket is attached to the request in step S901, the operation proceeds to step S904. In step S904, the unregistered numbered ticket attached to the request is sent to the numbered-ticket management unit 202 where it is determined whether the unregistered numbered ticket is registerable. If the unregistered numbered ticket is determined to be non-registerable, the operation proceeds to step S905 where the unregistered numbered ticket is sent directly back to the client device 102 that made the request.

On the other hand, if the unregistered numbered ticket is determined to be registerable in step S904, the operation proceeds to step S906, where the received request is registered on the schedule table 205a and a value "1" is added to the current total value of the request-number counter 204. Subsequently, in step S907, the identifier for the numbered ticket is changed from unregistered to registered, and the registered numbered ticket is sent to the client device 102 that made the request. In step S908, the lowest reference number of the unregistered numbered tickets is updated in the numbered-ticket management unit 202.

Subsequently, in step S909, it is determined by the numbered-ticket management unit 202 whether there are any unregistered numbered tickets remaining. If it is determined that an unregistered numbered ticket is present, the request-reception process corresponding to the order arrangement mode is finished. On the other hand, if it is determined in step S909 that there are no unregistered numbered tickets remaining, the operation proceeds to step S910. In step S910, the expiration timer for unregistered numbered tickets is stopped in the numbered-ticket management unit 202, and the order arrangement mode is subsequently switched to the regular mode.

Figure 10:
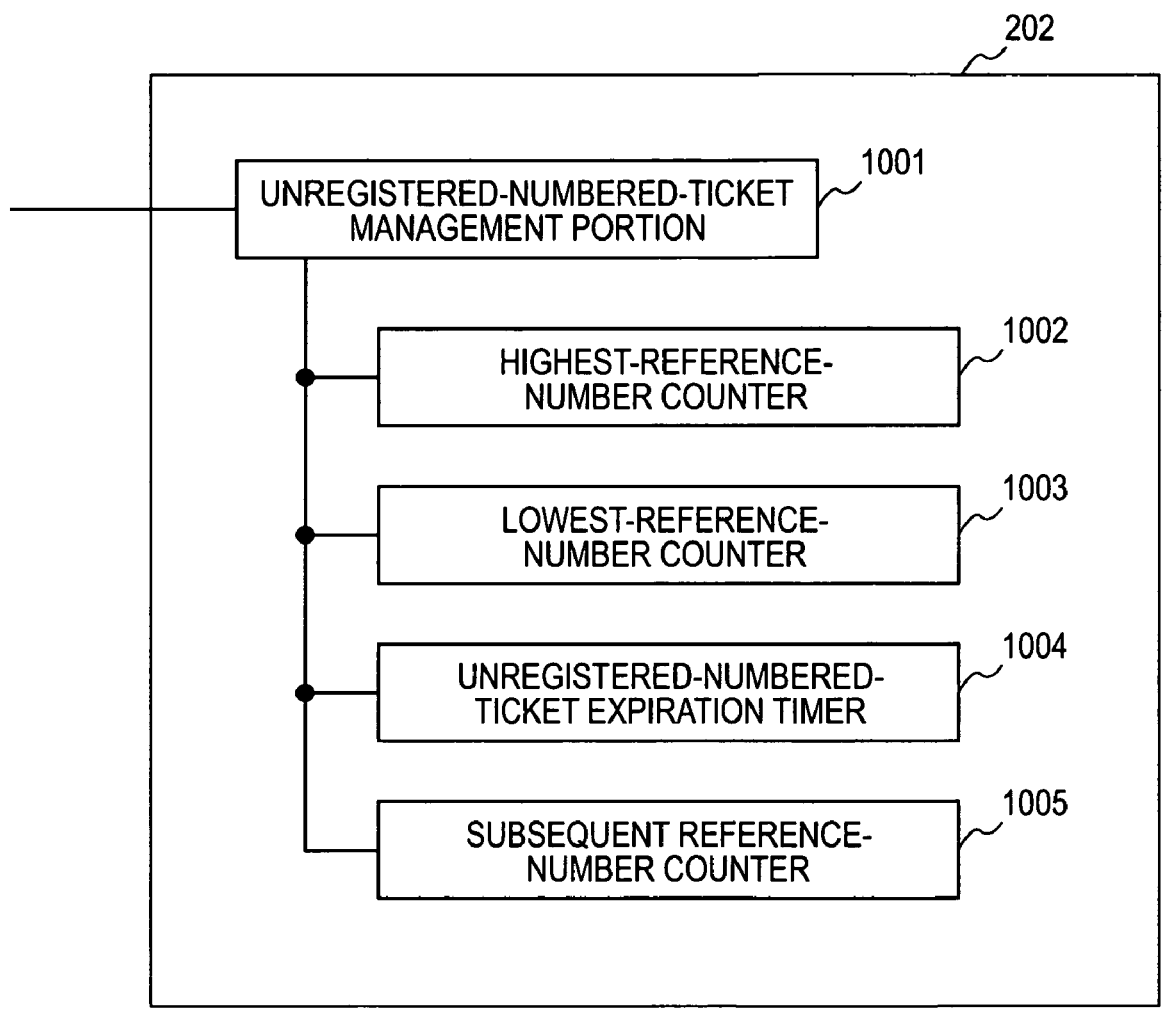
FIG. 10 is a schematic diagram illustrating an internal structure of the numbered-ticket management unit.

FIG. 10 is a schematic diagram illustrating the internal structure of the numbered-ticket management unit 202.

Referring to FIG. 10, the numbered-ticket management unit 202 includes an unregistered-numbered-ticket management portion 1001 configured to manage unregistered numbered tickets, a highest-reference-number counter 1002 configured to memorize the highest reference number issued, a lowest-reference-number counter 1003 configured to memorize the lowest reference number of the currently valid numbered tickets, an unregistered-numbered-ticket expiration timer 1004 which is activated when the scheduler 104 is in the order arrangement mode and stopped when the scheduler 104 shifts from the order arrangement mode to the regular mode, and which manages the expiration period of each unregistered numbered ticket, and a subsequent reference-number counter 1005 configured to memorize which numbered tickets are to be invalidated every time the timer value of the unregistered-numbered-ticket expiration timer 1004 becomes zero.

When a numbered ticket is issued, the highest-reference-number counter 1002 is updated. On the other hand, the lowest-reference-number counter 1003 is updated when the numbered-ticket management unit 202 receives an inquiry from the request management unit 201 regarding the lowest acceptable numbered ticket in step S904 in FIG. 9, or when a reference number received from the request management unit 201 corresponds to the lowest-reference-number counter 1003 and the numbered-ticket management unit 202 thus notifies the request management unit 201 that the numbered ticket is acceptable, or when the timer value of the unregistered-numbered-ticket expiration timer 1004 becomes zero and the numbered ticket is thus determined to be invalid.

Figure 11:
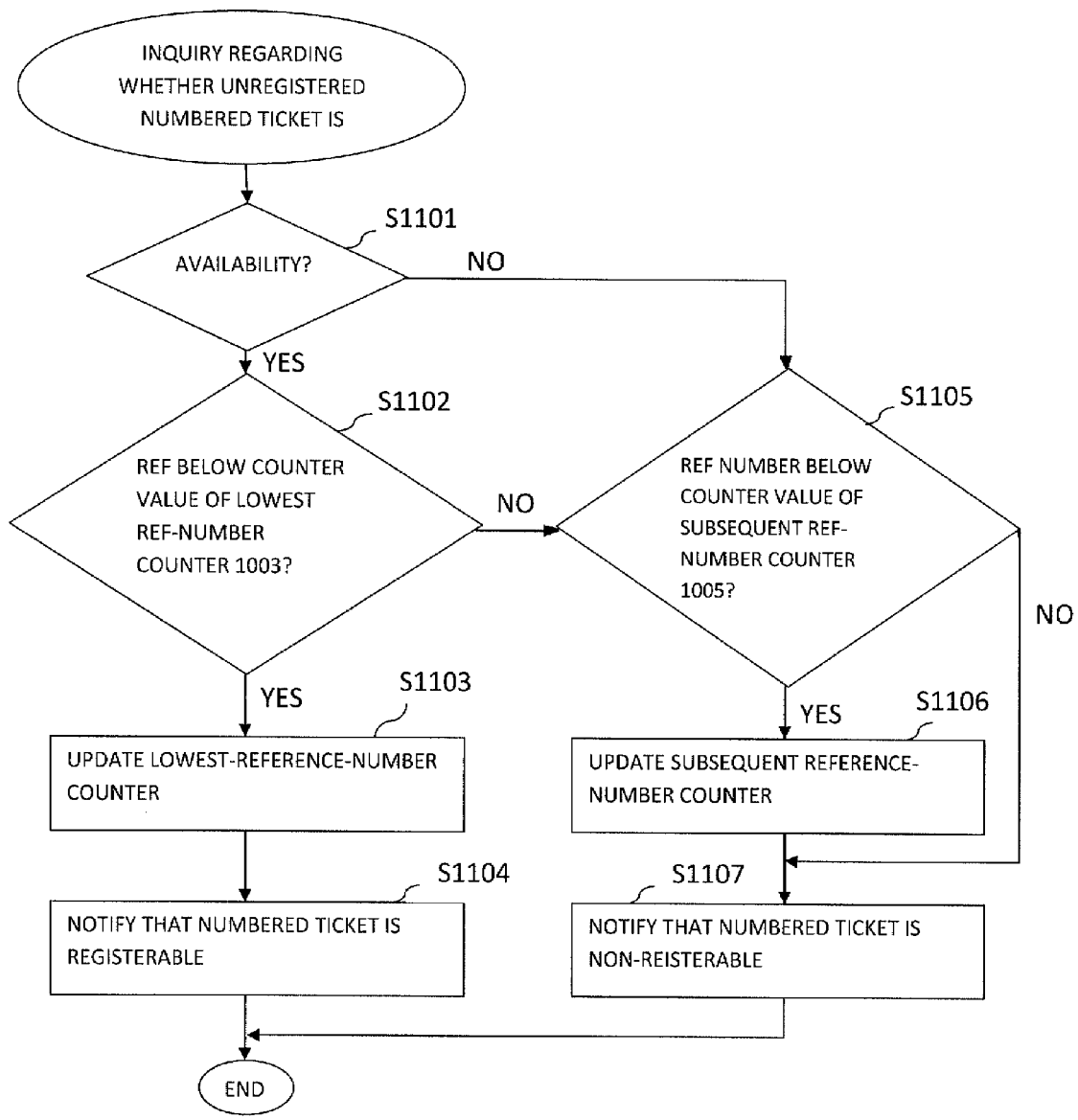
FIG. 11 is a flow chart of an operation performed by the numbered-ticket management unit of the scheduler in a case where an unregistered numbered ticket is being determined to be registerable or non-registerable.

FIG. 11 is a flow chart of an operation performed by the numbered-ticket management unit 202 of the scheduler 104 in a case where it is determined whether an unregistered numbered ticket is registerable or non-registerable.

In step S1101, it is determined whether the schedule table 205a has availability, or in other words, whether an unregistered numbered ticket is registerable or non-registerable in the schedule table 205a. If it is determined that the schedule table 205a has availability, the operation proceeds to step S1102. On the other hand, if it is determined in step S1101 that the schedule table 205a does not have availability, the operation proceeds to step S1105.

When the schedule table 205a is determined to have availability in step S1101, the reference number of the numbered ticket and the counter value of the lowest-reference-number counter 1003 are compared in step S1102. Based on this comparison result, it is determined whether the reference number is equal to or below the counter value of the lowest-reference-number counter 1003. If the reference number is determined to be above the counter value of the lowest-reference-number counter 1003, the operation proceeds to step S1105. On the other hand, if the reference number is determined to be equal to or below the counter value of the lowest-reference-number counter 1003 in step S1102, the operation proceeds to step S1103.

Subsequently, in step S1103, the counter value of the lowest-reference-number counter 1003 is updated. In step S1104, the request management unit 201 is notified that the numbered ticket is registerable.

On the other hand, if it is determined that the schedule table 205a does not have availability in step S1101, or if the reference number of the numbered ticket inquired is determined to be above the counter value of the lowest-reference-number counter 1003 in step S1102, the reference number of the numbered ticket and the counter value of the subsequent reference-number counter 1005 are compared in step S1105. Based on this comparison result, it is determined whether the reference number is equal to or below the counter value of the subsequent reference-number counter 1005. If the reference number is determined to be below the counter value of the subsequent reference-number counter 1005, the operation proceeds to step S1106. On the other hand, if the reference number is determined to be equal to or above the counter value of the subsequent reference-number counter 1005 in step S1105, the operation proceeds to step S1107.

In step S1106, the counter value of the subsequent reference-number counter 1005 is updated to the reference number of the numbered ticket. In step S1107, the request management unit 201 is notified that the request corresponding to the inquired numbered ticket is non-registerable.

By performing such management of the numbered tickets, the order of requests from the client devices 102 can be managed even when the schedule table 205a has no availability.

The management method of the numbered tickets is not limited to the method described above. For example, a numbered-ticket management table may alternatively be used as long as the scheduler 104 has a sufficient memory space, or a plurality of lowest reference numbers may be provided such that registration is permitted as long as the schedule table 205a has availability.

Figure 12:
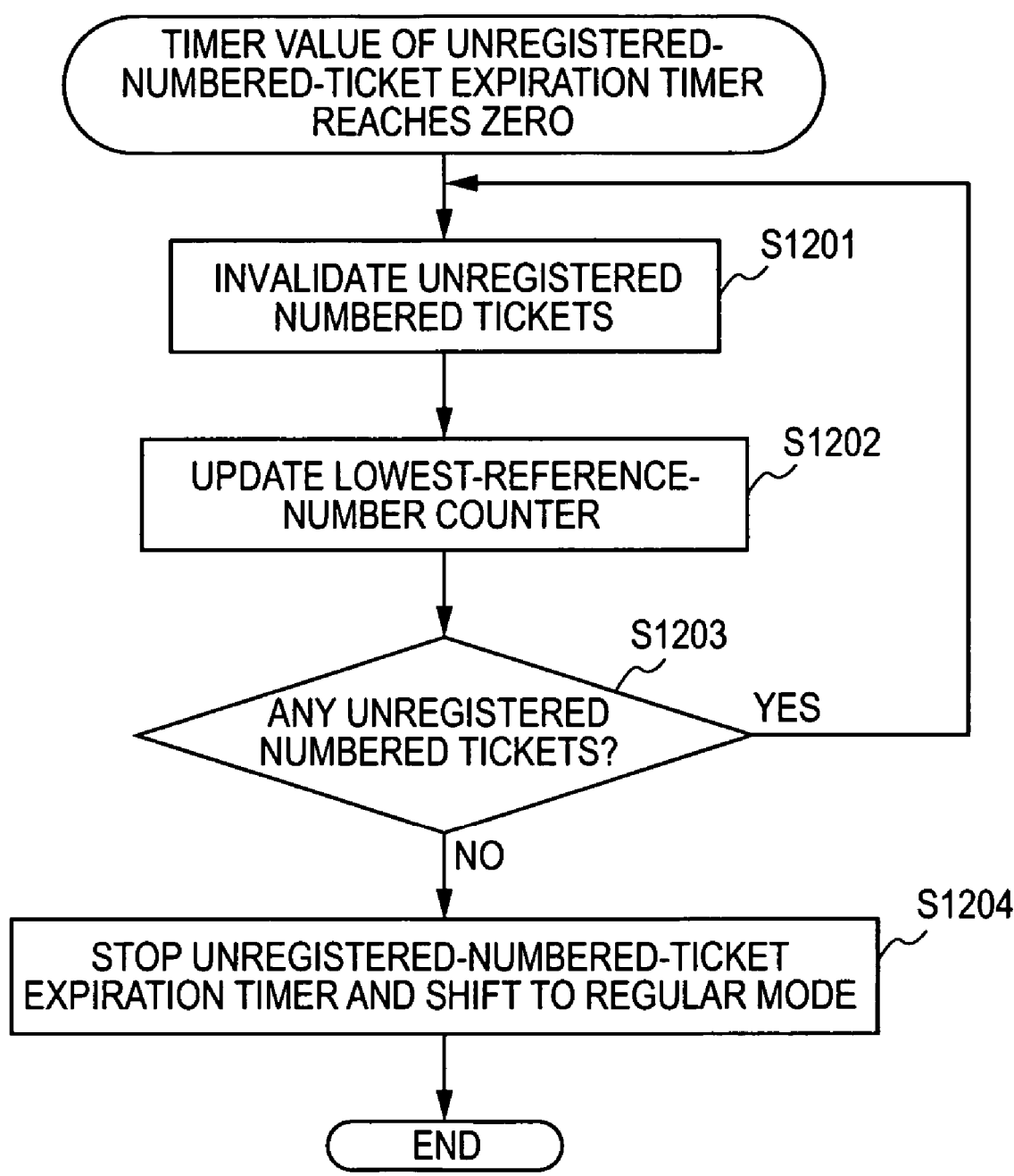
FIG. 12 is a flow chart of an invalidating operation of a numbered ticket using an unregistered-numbered-ticket expiration timer provided in the numbered-ticket management unit.

FIG. 12 is a flow chart of an invalidating operation of a numbered ticket using the unregistered-numbered-ticket expiration timer 1004 in the numbered-ticket management unit 202.

In the numbered-ticket management unit 202, the unregistered-numbered-ticket expiration timer 1004 is started at a point where the scheduler 104 shifts to the order arrangement mode. The timer value of the unregistered-numbered-ticket expiration timer 1004 becomes zero in synchronization with the predetermined waiting period of each of the client devices 102 for retrial.

When the timer value of the unregistered-numbered-ticket expiration timer 1004 becomes zero, the numbered tickets from the counter value of the lowest-reference-number counter 1003 to the counter value of the subsequent reference-number counter 1005 are all invalidated in step S1201. Subsequently, in step S1202, the counter value of the lowest-reference-number counter 1003 is updated to the counter value of the subsequent reference-number counter 1005. Accordingly, the invalid numbered tickets can be efficiently detected and discarded.

Subsequently, in step S1203, it is determined whether there are unregistered numbered tickets. This determination step is performed by comparing the counter value of the lowest-reference-number counter 1003 updated in step S1202 with the counter value of the highest-reference-number counter 1002, and then determining whether there is a difference between the two counter values. If the two counter values are different, it is determined that there is an unregistered numbered ticket, whereas if the two counter values are the same, it is determined that there are no unregistered numbered tickets.

In a case where it is determined in step S1203 that there is an unregistered numbered ticket, or in other words, if it is determined that the counter value of the lowest-reference-number counter 1003 updated in step S1202 and the counter value of the highest-reference-number counter 1002 are different, the operation returns to step S1201 and repeats the process from step S1201 to step S1203 until it is determined that there are no unregistered numbered tickets remaining. On the other hand, in a case where it is determined in step S1203 that there are no unregistered numbered tickets, or in other words, if it is determined that the counter value of the lowest-reference-number counter 1003 updated in step S1202 and the counter value of the highest-reference-number counter 1002 are the same, the operation proceeds to step S1204. In step S1204, the unregistered-numbered-ticket expiration timer 1004 is stopped, and the scheduler 104 is subsequently switched from the order arrangement mode to the regular mode. Finally, the operation is finished.

In step S909 shown in FIG. 9, when the numbered-ticket management unit 202 receives an inquiry from the scheduler 104 regarding the presence of unregistered numbered tickets, the numbered-ticket management unit 202 performs the steps S1203 onward shown in FIG. 12.

Figure 13:
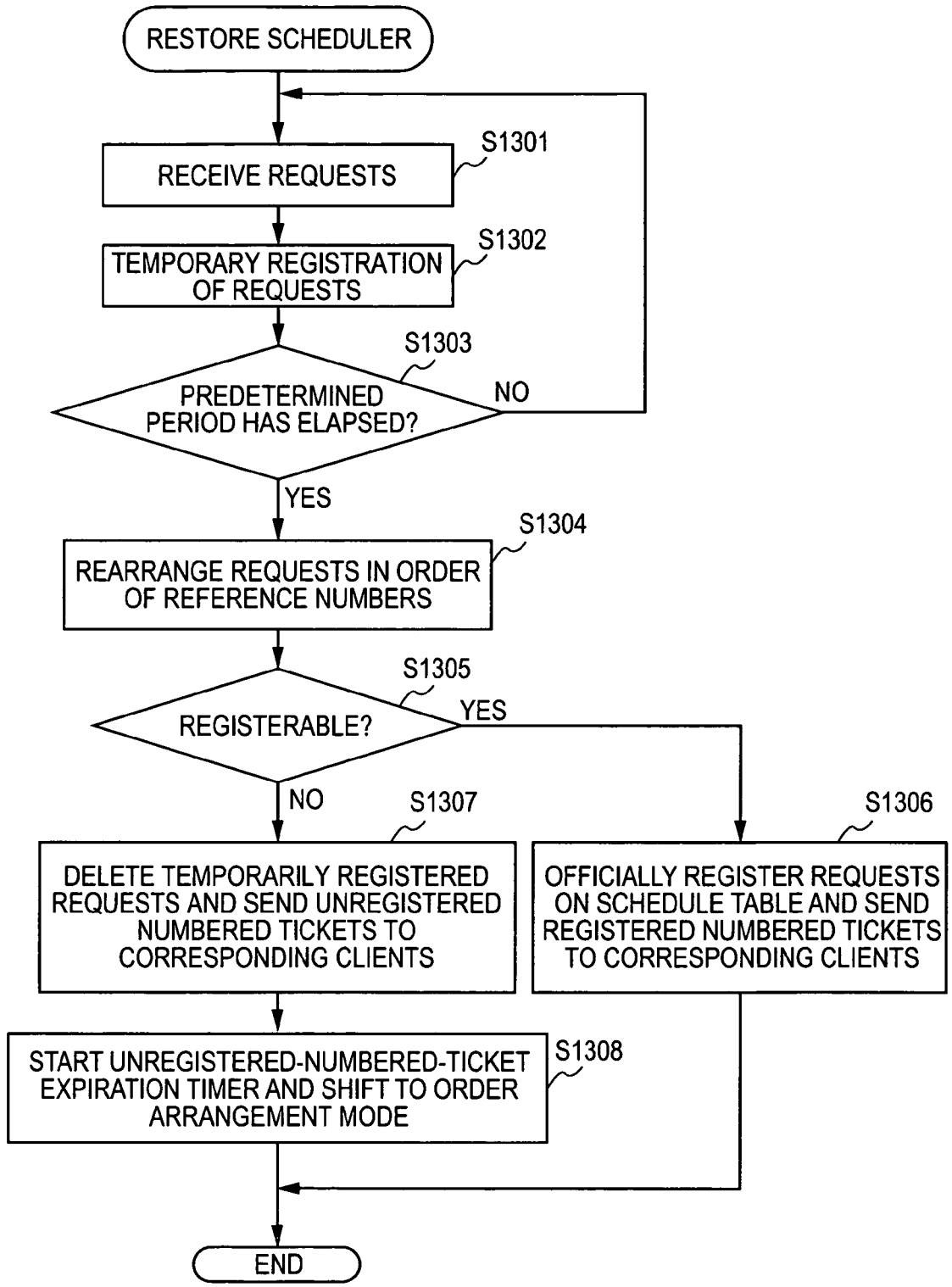
FIG. 13 is a flow chart of an operation performed by the scheduler in a case where the scheduler is restored after being shut down.

An operation performed when the scheduler 104 is restored will now be described. FIG. 13 is a flow chart of an operation performed by the scheduler 104 in a case where the scheduler 104 is restored after being shut down. Such a shutdown of the scheduler 104 may be user initiated or may be due to an interruption.

When the scheduler 104 is restored from the shutdown state, the scheduler 104 notifies each client device 102 that the scheduler 104 is restored. In step S1301, the scheduler 104 receives a request from each client device 102 for a predetermined time period after this notification of the restored state. Subsequently, in step S1302, the scheduler 104 temporarily registers the request received from each client device 102 in step S1301.

In step S1303, it is determined whether the predetermined time period has elapsed. If it is determined that the predetermined time period has not elapsed, the operation returns to step S1301 and repeats the process from step S1301 to step S1303 until the predetermined time period elapses. On the other hand, if it is determined in step S1303 that the predetermined time period has elapsed, the operation proceeds to step S1304.

In step S1304, the temporarily-registered requests are rearranged in the order of the reference numbers of the numbered tickets. Moreover, the requests without numbered tickets are inserted to the tail end of the numbered tickets rearranged in step S1304 in the order of the requests received.

Subsequently, in step S1305, it is determined whether the requests are registerable on the schedule table 205a sequentially from the front end of the temporarily-registered request table rearranged in step S1304. This determination is performed by referring to the maximum-request-number counter 203 and the request-number counter 204. If the requests are determined to be registerable, the operation proceeds to step S1306, where the requests are officially registered on the schedule table 205a. The request-number counter 204 is then counted up for the number of registered requests, and moreover, new registered numbered tickets are issued and sent to the corresponding client devices 102 that had made the requests.

On the other hand, if the requests are determined to be non-registerable in step S1305, the operation proceeds to step S1307, where the temporarily registered requests are deleted. Moreover, new unregistered numbered tickets are issued and sent to the corresponding client devices 102 that had made the requests. Subsequently, in step S1308, the numbered-ticket management unit 202 is commanded to start the unregistered-numbered-ticket expiration timer 1004. In this case, the scheduler 104 shifts to the order arrangement mode. On the other hand, when all of the requests are officially registered on the schedule table 205a at a point where the processing of all the temporarily registered requests is completed, the scheduler 104 shifts to the regular mode. After this restoring process of the scheduler 104, the request-reception process described above is performed.

According to the restoring process described above, even if the scheduler 104 is shut down and the schedule table 205a is initialized, the scheduler 104 according to one embodiment can restore the order of the requests received from the client devices 102 prior to the shutdown.

Furthermore, when the scheduler 104 according to one embodiment receives requests from the client devices 102, the scheduler 104 can properly manage the order of the requests from the client devices 102 with respect to the reference numbers of the numbered tickets while reducing the load upon the scheduler 104. Moreover, even when the scheduler 104 is shut down, the scheduler 104 can restore the order of requests prior to the shutdown, whereby the order of requests from the client devices 102 can be managed in a more proper manner.

Second Embodiment

A second exemplary embodiment is directed to an example of a scheduling operation in a case where a schedule management program is embedded in a printer.

Figure 14:
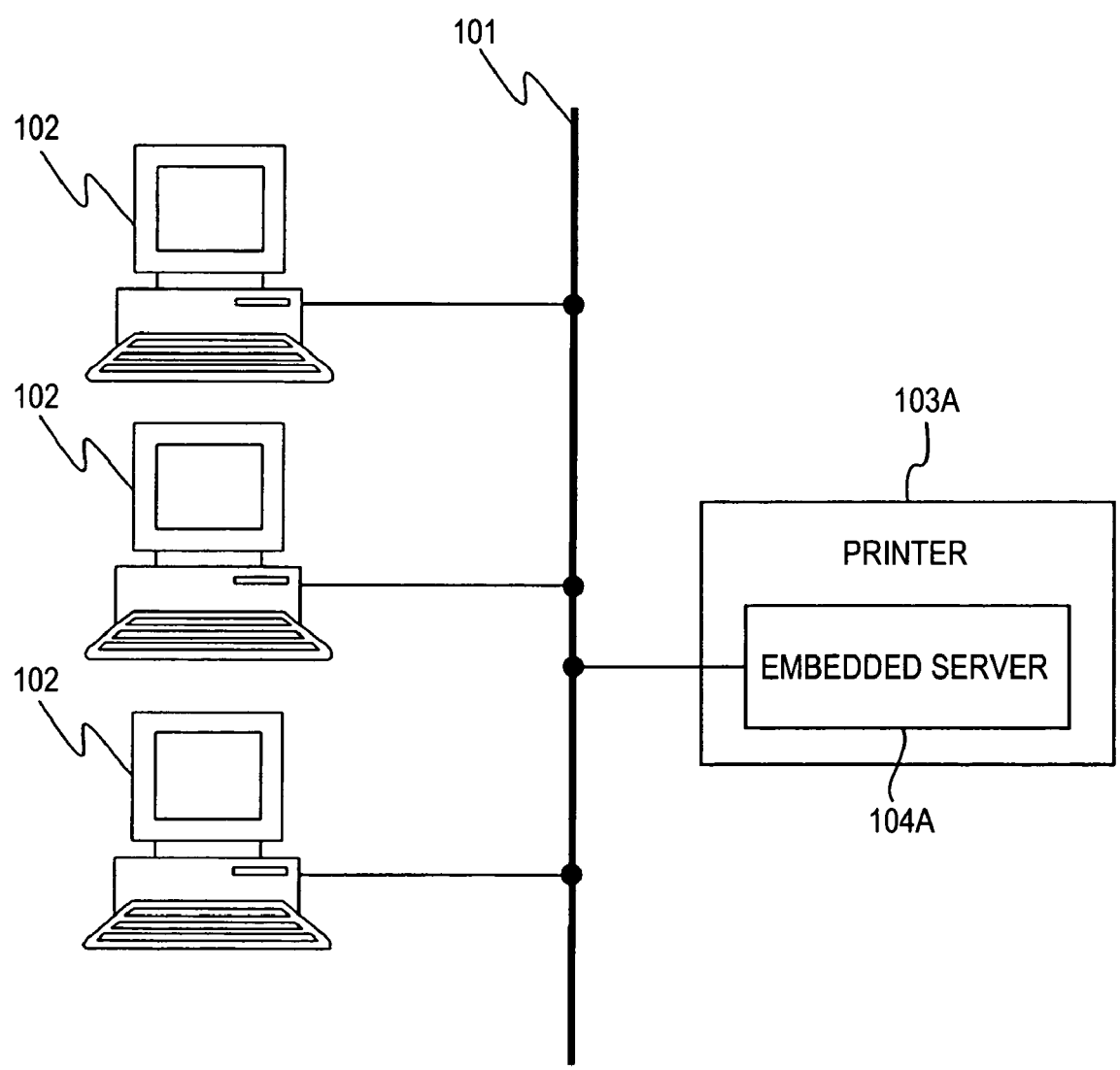
FIG. 14 is a schematic diagram of a printing information management system according to a second embodiment of the present invention.

FIG. 14 is a schematic diagram of a printing information management system according to the second exemplary embodiment. Components in FIG. 14 that correspond to those in FIG. 1 are given the same reference numerals, and therefore, detailed descriptions of those components will be omitted below. The description below will mainly include the differences from FIG. 1.

A scheduler 104A is embedded in a printer 103A, and has the same components as the scheduler 104 according to the first embodiment shown in FIG. 2.

The printer 103A may be, for example, an electro-photographic type or an inkjet type applied to an image formation engine.

The requests managed by the scheduler 104A according to the second embodiment may include, for example, a print request for the printer 103A, a print-job-list obtaining request, an operation request for deleting or temporarily stopping a print job, a connection request, and a disconnection request. The types of requests are not limited to the requests mentioned above. The present invention can be effectively applied when requests received from a plurality of clients need to be arranged in order.

Referring to a flow chart illustrated in FIG. 15, a control procedure of a print request performed by the scheduler 104A embedded in the printer 103A will be described.

In FIG. 15, the plurality of client devices 102 and the printer 103A containing the scheduler 104A and an application-server function are connected in a communicable manner via the network 101. The printer 103A performs the operation illustrated in the flow chart of FIG. 3 in the first embodiment and waits for a print request from one of the client devices 102. Each step will be described below in detail.

When a printing operation is to be performed, one of the client devices 102 outputs a print request to the scheduler 104A of the printer 103A via the network 101 in step S1501.

The scheduler 104A receiving the print request determines whether to register the print request as described in the flow chart of FIG. 3 in the first embodiment. If necessary, a numbered ticket is issued.

If the print request is determined to be non-registerable, the operations shown in the flow charts of FIGS. 9, 11, 12, and 13 in the first embodiment are performed.

For example, a print request is determined to be non-registerable in a case where various requests are already registered on the management table to a limited capacity, in a case where there is no memory space to be used by the scheduler 104A, or in a case where it is determined that the processing performance of the scheduler 104A could possibly deteriorate. Accordingly, in these cases, the scheduler 104A of the printer 103A determines that the management table has no availability for an order control operation.

On the other hand, when the print request from the client device 102 is registerable, the operation shown in the flow chart of FIG. 4 is performed.

Specifically, in step S1502, based on the registered order of the requests, an order control operation corresponding to each request is performed.

In step S1503, when the print job produced by the client device 102 is receivable, the client device 102 is notified to transfer the print job.

The printer 103A presumably has a small memory capacity for storing print jobs. In other words, the client device 102 is notified in step S1503 when a printing operation of a print job from another client device 102 is finished and the print job is released from a print-job memory portion of the printer 103A such that the print-job memory portion has sufficient space for receiving another print job.

In step S1504, after receiving the command from the scheduler 104A to transfer the print job, the client device 102 transfers the print job to a printer controller (corresponding to a portion of the application server 103) in the printer 103A.

In step S1505, the printer 103A receiving the print job via the printer controller performs a print output via the printer engine based on the received print job. When the printing operation of the print job including the print output is completed, the printer 103A notifies the scheduler 104A that the printing operation is finished.

In step S1506, the scheduler 104A notified by the printer controller that the printing operation is completed finishes the print request received in step S1501 and notifies the corresponding client device 102 that the printing operation is completed.

Other Embodiments

The scheduler 104 or 104A according to the above embodiments may take any form as long as it includes the components illustrated in FIG. 2. For example, the scheduler 104 or 104A may be directly embedded in an application server or device, or may be a type that solely manages a plurality of application servers or devices.

According to an embodiment of the present invention, a computer may be used to perform a program of the processes of FIGS. 3, 4, 6, 8, 9, 11, 12, and 13. Moreover, as feature for supplying the program to the computer, a computer-readable recording medium that stores the program or a transmission medium that transmits the program may be used. The computer-readable recording medium may be, for example, a CD-ROM, a DVD, a memory, or a hard disc. On the other hand, the transmission medium may be, for example, the Internet or a LAN. The technical scope of the present invention is not limited to the above embodiments, and modifications are permissible within the scope and spirit of the present invention.

As described above, in the above embodiments, when a request is received from each of the client devices 102, it is determined in step S402 of FIG. 4 whether the schedule table 205a managing the requests based on the received order has availability. If the schedule table 205a is determined to have availability, the request is registered on the schedule table 205a in step S403, whereas if is it determined that the schedule table 205a does not have availability, an unregistered numbered ticket indicating that the request is not registered on the schedule table 205a is issued. Then, in step S405, the unregistered numbered ticket is sent to the corresponding client device 102 from which the request was originally sent. Accordingly, even when multiple requests are sent from the plurality of client devices 102, the requests can be processed in the order of the requests received without an excessive load.

Furthermore, when the scheduler 104 is restored after a shutdown, each of the client devices 102 is notified that the scheduler 104 is restored. Subsequently, in step S1304 of FIG. 13, requests received from the client devices 102 within the predetermined time period from the notification are arranged in order based on the reference numbers of the requests. Then, in step S1306, registered numbered tickets are issued in accordance with the order of the arranged requests. Thus, even if the scheduler 104 is shut down and the schedule table 205a is initialized, the requests can be processed in the order of the requests registered prior to the shutdown.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-312922 filed Oct. 27, 2004 and Japanese Application No. 2005-268765 filed Sep. 15, 2005, which are hereby incorporated by reference herein in their entirety.

What is claimed is:

1. An information management device comprising:
a receiving unit configured to receive requests from a plurality of client devices;
a management-table memory unit configured to store a management table managing the requests received by the receiving unit based on a receiving order;
a determining unit configured to determine whether each request received by the receiving unit is registerable in the management table based on a request number in the management table;
a registering unit configured to register the request in the management table when the request is determined by the determining unit to be registerable in the management table;
a numbered-ticket issuing unit configured to issue an unregistered numbered ticket given a reference number in correspondence with the receiving order, when the request is determined by the determining unit to be non-registerable in the management table, and to send the unregistered numbered ticket to one of the plurality of client devices from which the request was sent, the unregistered numbered ticket indicating that the request is not registered in the management table; and
a numbered-ticket management unit configured to manage the unregistered numbered tickets which are issued by the numbered-ticket issuing unit based on a lowest reference number of the valid unregistered numbered tickets,
wherein the numbered-ticket management unit controls the registering unit to register the request in the management table when the unregistered numbered ticket is attached to the request, the request is determined by the determining unit to be registerable in the management table based on the request number in the management table, and the reference number of the unregistered numbered ticket attached to the request is the lowest reference number.

2. The information management device according to claim 1, wherein the numbered-ticket management unit manages the unregistered numbered ticket which is issued by the numbered-ticket issuing unit based on an expiration timer of the unregistered numbered ticket and a subsequent reference number which becomes the lowest reference number when the expiration timer expires, and wherein the numbered-ticket management unit updates the subsequent reference number when the unregistered numbered ticket is attached to the request, the request is determined by the determining unit to be non-registerable in the management table based on the request number in the management table, and the reference number of the unregistered numbered ticket attached to the request is below the subsequent reference number, to the reference number of the numbered ticket.

3. The information management device according to claim 1, further comprising:

a restoration notifying unit configured to notify each of the plurality of client devices when the information management device is restored after a shutdown state; and a request arranging unit configured to arrange requests in order based on reference numbers of the requests, the requests being sent from the plurality of client devices within a predetermined time period from the notification of the restoration notifying unit, wherein the numbered-ticket issuing unit issues each of the registered numbered tickets based on the order of the requests arranged by the request arranging unit.

4. The information management device according to claim 1, further comprising:

an encrypting unit configured to encrypt each of the numbered tickets issued by the numbered-ticket management unit; and a decrypting unit configured to decrypt the numbered tickets encrypted by the encrypting unit.

5. The information management device according to claim 4, wherein the unregistered numbered ticket issued by the numbered-ticket issuing unit is given a reference number in correspondence with the order of requests that are not registered in the management table.

6. The information management device according to claim 4, further comprising a setting unit configured to set the unregistered numbered ticket as a registerable numbered-ticket when the determining unit determines the request to be registerable in the management table after the unregistered numbered ticket is issued by the numbered-ticket issuing unit, wherein the registering unit registers the request corresponding to the unregistered numbered ticket by the setting unit in the management table.

7. The information management device according to claim 4, wherein the numbered-ticket issuing unit provides the unregistered numbered ticket with an expiration period when the unregistered numbered ticket is issued, wherein the unregistered numbered ticket is invalidated after the expiration period.

8. The information management device according to claim 1, further comprising:

an order management unit configured to manage a processing order of the requests registered in the management table; and a request permitting unit configured to permit one of the plurality of client devices from which the request was sent to perform the request when the request reaches its turn in the processing order managed by the order management unit.

9. The information management device according to claim 1, further comprising:

an encrypting unit configured to encrypt each of the numbered tickets issued by the numbered-ticket issuing unit;

a decrypting unit configured to decrypt the numbered tickets encrypted by the encrypting unit.

10. An information management system comprising:

the information management device according to claim 1; and a plurality of client devices configured to send requests to the information management device.

11. A method for managing information comprising the steps of:

receiving requests, by a scheduler having a memory for storing a management table, from a plurality of client devices;

determining whether each request received in the receiving step is registerable in the management table stored in the memory based on a request number in the management table, the management table managing the requests received in the receiving step based on a receiving order;

registering the request, by the scheduler, in the management table if the request is determined in the determining step to be registerable in the management table; and issuing an unregistered numbered ticket for the request given a reference number in correspondence with the receiving order, by the scheduler, when the request is determined in the determining step to be non-registerable in the management table, and sending the unregistered numbered ticket indicating that the request is not registered in the management table to one of the plurality of client devices from which the request was sent, the unregistered numbered ticket indicating that the request is not registered in the management table; and managing the unregistered numbered tickets which are issued based on a lowest reference number of the valid unregistered numbered tickets, wherein the managing step controls the registering step to register the request in the management table when the unregistered numbered ticket is attached to the request, the request is determined by the determining step to be registerable in the management table based on a request number in the management table, and the reference number of the unregistered numbered ticket attached to the request is the lowest reference number.

12. The method according to claim 11 wherein the managing step manages the unregistered numbered ticket which is issued in the issuing step based on an expiration timer of the unregistered numbered ticket and a subsequent reference number which becomes the lowest reference number when the expiration timer expires, and wherein the managing step updates the subsequent reference number when the unregistered numbered ticket is attached to the request, the request is determined by the determining step to be non-registerable in the management table based on a request number in the management table, and the reference number of the unregistered numbered ticket attached to the request is below the subsequent reference number, to the reference number of the numbered ticket.

13. The method according to claim 11, further comprising the steps of:

notifying each of the plurality of client devices when a restored state is achieved after a shutdown state; and arranging requests in order based on reference numbers of the requests, the requests being sent from the plurality of client devices within a predetermined time period from the notification in said notifying step, wherein each of the registered numbered tickets is issued in the registered numbered ticket issuing step based on the order of the requests arranged in said arranging step.

14. The method according to claim 11, wherein the unregistered numbered ticket issued in the numbered ticket issuing step is given a reference number in correspondence with the order of requests that are not registered in the management table.

15. The method according to claim 11, further comprising setting the unregistered numbered ticket when the request is determined in said determining step to be registerable in the management table after the unregistered numbered ticket is issued in the numbered ticket issuing step, wherein the request corresponding to the unregistered numbered ticket set in said setting step is registered in the management table in said registering step.

16. The method according to claim 11, wherein the unregistered numbered ticket issued in the numbered ticket issuing step is provided with an expiration period, the unregistered numbered ticket is invalidated after the expiration period.

17. The method according to claim 11, further comprising permitting one of the plurality of client devices from which the request was sent to perform the request when the request reaches its turn in a processing order of the requests registered in the management table.

18. The method according to claim 11, further comprising the steps of:

encrypting at least one of the numbered tickets issued in the numbered ticket issuing step; and decrypting the at least one of the numbered tickets encrypted in the encrypting step.

19. A computer-readable storage medium for storing the computer-executable process steps of claim 11.

* * * * *